United States Patent [19]
Yotsumoto et al.

[11] 4,374,962
[45] Feb. 22, 1983

[54] ADHESIVE FOR POLYESTER FIBROUS MATERIAL

[75] Inventors: Toshihiro Yotsumoto, Higashimurayama; Kazuo Koyama, Sayama, both of Japan

[73] Assignee: Bridgestone Tire Company Limited, Tokyo, Japan

[21] Appl. No.: 366,032

[22] Filed: Apr. 6, 1982

[30] Foreign Application Priority Data

Apr. 10, 1981 [JP] Japan .................................. 56-52937

[51] Int. Cl.³ .......................... C08G 8/20; C08G 8/24
[52] U.S. Cl. .................................... 525/442; 525/501; 528/137; 528/143; 528/144; 528/147; 528/153; 528/155; 428/480; 428/482
[58] Field of Search ............... 528/143, 144, 153, 155, 528/147, 137; 525/442, 501

[56] References Cited

U.S. PATENT DOCUMENTS

| | | | |
|---|---|---|---|
| 2,477,641 | 8/1949 | Nagel | 528/155 X |
| 2,878,198 | 3/1959 | Ingram et al. | 528/147 X |
| 3,437,610 | 4/1969 | Mouit | 528/155 X |
| 3,835,082 | 9/1974 | Wright | 528/155 X |
| 4,009,304 | 2/1977 | Dixon et al. | 528/155 X |
| 4,112,160 | 9/1978 | Kako et al. | 528/155 X |

*Primary Examiner*—Howard E. Schain
*Attorney, Agent, or Firm*—Sughrue, Mion, Zinn, Macpeak and Seas

[57] ABSTRACT

An adhesive comprising a cocondensate of formaldehyde with m-alkylphenol or its derivative and alkylresorcin is excellent in the adhesion, heat resistance and flexibility and can bond firmly polyester fibrous material with rubber.

2 Claims, No Drawings

ADHESIVE FOR POLYESTER FIBROUS MATERIAL

BACKGROUND OF THE INVENTION (1) Field of the Invention

The present invention relates to an adhesive for polyester fibrous material, and more particularly relates to a novel adhesive capable of bonding strongly polyester fibrous material with rubber and having high resistance against deterioration during the use at high temperature.

(2) Description of the Prior Art

Polyester materials, such as polyethylene terephthalate and the like, which are linear polymers having ester linkages in the main chain, are superior to nylon material and the like in the retention of stable dynamic properties, for example, low stress relaxation, low creep property and good recovery after stretching. Therefore, polyester material is very advantageously used as a reinforcing material for rubber articles, such as tire, belt, air cushion, rubber hose and the like, in the form of a filament, yarn, cord, cable, cord fabric, canvas and the like.

However, polyester has a dense hyper-structure and a small number of functional groups, and therefore when it is intended to use polyester material as a reinforcing material for these rubber articles, polyester material cannot be satisfactorily bonded to rubber by means of RFL liquid comprising resorcin/formaldehyde initial condensate and rubber latex and being an adhesive capable of bonding strongly nylon material, rayon material and the like to rubber.

In order to obviate this drawback, there have hitherto been proposed a method, wherein polyester surface is treated with alkali or amine to increase the number of active groups, such as —OH, —COOH, —NR$_2$ groups and the like, wherein R represents a hydrogen atom or an alkyl group, on the surface, and then the polyester is treated with RFL; and a method, wherein a functional group having a bonding ability with hydrogen or capable of forming primary bond is introduced into polyester surface by an isocyanate compound or epoxy compound, and then the polyester is treated with RFL; and various adhesive compositions used for these methods.

However, isocyanate compound and epoxy compound have a high reactivity and react with water and RF, which water is used as a solvent for RFL, and therefore it is difficult to use isocyanate compound or epoxy compound in a one-bath system adhesive liquid. In order to obviate this drawback, the treatment for polyester with the adhesive must be carried out in two stages. However, a more complicated installation and a larger amount of heat are required in the two stage treatment, and the two stage treatment is not preferable in view of the resource saving and energy saving. Moreover, epoxy compound and isocyanate compound fume in a large amount during the heat treatment, and are not preferable in view of environmental pollution and public nuisance. In addition, polyester fiber is hardened by a pretreatment with an epoxy compound or isocyanate compound, and it is difficult to treat the polyester fiber. As a result, rubber articles reinforced with polyester fibers treated with the adhesive containing an epoxy compound or isocyanate compound are short in the life, and when the rubber articles are used under high strain or at high temperature, the adhesive layer deteriorates rapidly.

As the adhesive to be used for treating polyester fibrous material in a two stage treatment, there has been proposed a combination system of RFL and a condensate obtained by reacting formaldehyde with a mixture of monohydric phenol and polyhydric phenol (Japanese Patent Laid-open Application No. 37,986/74). The inventors have made a follow-up test with respect to a m-cresol/resorcin/formaldehyde cocondensate and the like, which are typical cocondensates described in this Japanese patent laid-open application and found that adhesive using the cocondensate is still insufficient in the adhesive strength and is poor in the heat resistance.

While, as an adhesive for polyester fibrous materials, which can treat them in one stage in a one bath system, there has been proposed an adhesive, which uses a tricyclic cocondensate formed of a resorcin derivative and a phenol derivative in combination with RFL (Japanese Patent Application Publication No. 11,251/71). Cocondensates concretely disclosed in the Japanese Patent Application Publication No. 11,251/71 are cocondensates of resorcin or a resorcin derivative, such as alkylresorcin, o- or p-substituted alkyl- or halogenophenol and formaldehyde. These cocondensates are produced through a methylol compound formed by the reaction of a bifunctional o- or p-substituted alkyl- or halogeno-phenol with formaldehyde. Accordingly, the phenol ring of the resulting cocondensate has no longer electrophilically reactive site, and the cocondensate is poor in the reactivity with RF and RFL and is low in the adhesive strength.

SUMMARY OF THE INVENTION

The inventors have made various investigations with respect to the cocondensates of formaldehyde with resorcin or its derivative and a phenol derivative described in the above described Japanese Patent Application Publication No. 11,251/71, and found that cocondensates of formaldehyde with a m-alkylphenol or its derivative and m-alkylresorcin, which cocondensates are not described in any of the above described Japanese patent laid-open application and Japanese patent application publication, can be treated in a one stage treatment and are excellent in the adhesion, heat resistance and flexibility. As a result, the present invention has been accomplished.

The feature of the present invention lies in an adhesive for polyester fibrous material, comprising an alkylphenol/alkylresorcin/formaldehyde cocondensate having substantially an average molecular weight of 300–600 and obtained by condensing a compound selected from compounds represented by a general formula

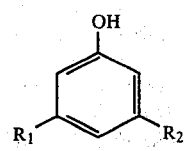

wherein R$_1$ represents a hydrogen atom or an alkyl group having 1–3 carbon atoms, and R$_2$ represents an alkyl group having 1–4 carbon atoms, and a compound selected from compounds represented by a general formula

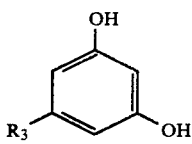

wherein $R_3$ represents an alkyl group having 1-3 carbon atoms, together with formaldehyde in the presence of an acidic catalyst.

DESCRIPTION OF THE PREFERRED EMBODIMENT

As the compounds represented by the formula

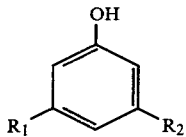

wherein $R_1$ represents a hydrogen atom or an alkyl group having 1-3 carbon atoms, and $R_2$ represents an alkyl group having 1-4 carbon atoms, use is made of m-cresol, m-ethylphenol, m-propylphenol and 3,5-xylenol.

As the compounds represented by the formula

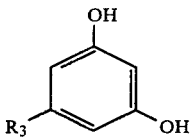

wherein $R_3$ represents an alkyl group having 1-3 carbon atoms, use is made of 5-methylresorcin, 5-ethylresorcin and 5-propylresorcin.

The cocondensate of the present invention can be obtained by cocondensing formaldehyde with one of the above described alkylphenols and one of the above described alkylresorcins. The cocondensation reaction is carried out in the following manner. An alkylphenol, water and a small amount of sodium hydroxide are charged into a flask, and 37% aqueous formaldehyde solution is dropwise added to the mixture to form a dimethylol derivative of the alkylphenol, and then ethyl alcohol is added to the reaction mass to form a homogeneous solution. While, into another separable flask are charged alkylresorcin, water and a small amount of an acidic catalyst, such as hydrochloric acid, sulfuric acid, oxalic acid or the like. After the resulting mass is formed into a homogeneous solution, the above obtained solution of dimethylol derivative of alkylphenol is dropwise added to the alkylresorcin solution to carry out a cocondensation reaction and to obtain an alkylphenol/alkylresorcin/formaldehyde cocondensate.

According to the analysis of molecular weight distribution by means of an analytical instrument for molecular weight, such as GPC or the like, the alkylphenol/alkylresorcin/formaldehyde cocondensate of the present invention has a molecular weight distribution extending over a certain range. However, a cocondensate having a molecular weight within the range of 300-600 is effectively used as an adhesive. In the present invention, it is preferable that a cocondensate having a molecular weight within this range is selectively used, or a cocondensate consisting mainly of a cocondensate having a molecular weight within this range is used.

The cocondensate of the present invention is used together with RFL, which is a commonly known vulcanizable adhesive assistant. The cocondensate can be adhered to polyester fibrous material in any of one stage treatment and two stage treatment, and it is preferable to dilute the adhesive with water prior to the treatment of the fibrous material with the adhesive. When the alkylphenol/alkylresorcin/formaldehyde cocondensate is dispersed in water by using an optional anionic surfactant by means of a dispersing apparatus, such as ball mill, sand mill or the like. In this case, it is necessary that the surfactant is used in an amount of as small as possible in order to develop effectively the adhesive strength of the cocondensate in so far as the dispersed state is not deteriorated.

In the two stage treatment, the cocondensate may be dissolved in water previously mixed with a proper organic solvent, such as alcohol, ketone or the like, which is used in place of surfactant, and used.

In the one stage treatment, an aqueous solution or aqueous dispersion of the above described cocondensate is mixed with RFL to form an adhesive composition liquid of the present invention.

The mixing ratio of the cocondensate to RFL is within the range of 25/100-125/100 (in solid basis and weight ratio). When the mixing ratio is lower than the lower limit or is higher than the upper limit of the above described mixing ratio, the resulting adhesive composition liquid is poor in the adhesive strength.

The above obtained adhesive composition liquid (hereinafter, referred to as adhesive liquid) is adhered to a polyester fibrous material to produce an adhesive-treated polyester fibrous material. The above treated fibrous material is contacted with vulcanizable unvulcanized rubber, and the resulting mass is vulcanized, whereby the rubber can by firmly bonded to the polyester fibrous material. As the method for adhering the adhesive liquid to the polyester fibrous material, there can be used a method wherein the fibrous material is immersed in the adhesive liquid; a method wherein the adhesive liquid is applied to or sprayed on the fibrous material; and the like. These methods can be properly selected depending upon the purpose.

After the adhesive liquid is adhered to the fibrous material, the fibrous material is heat treated to produce an adhesive-treated polyester fibrous material. This heat treatment is carried out at a temperature of not lower than 200° C., preferably 220°-250° C. The reason is as follows. The adhesive of the present invention exhibits its adhesive strength after the adhesive has been diffused into polyester fiber. As the treating temperature is higher, more excellent result can be obtained. When the temperature is lower than 200° C., the diffusion property of the adhesive is very poor. While, when the temperature is higher than 250° C., polyester fiber is deteriorated and is decreased in its strength and a satisfactory result cannot be obtained. In the treatment by an ordinary adhesive, a drying treatment is carried out at a temperature of not higher than 200° C. in order to volatilize the solvent before this heat treatment. In the present invention also, this drying treatment can be carried out before the heat treatment.

When the cocondensate according to the present invention is adhered to polyester fibrous material in the two stage treatment, the polyester fibrous material is immersed in an aqueous alkali solution or aqueous dispersion of the cocondensate, or in an aqueous solution containing the cocondensate and an organic solvent, such as alcohol or the like; the fibrous material is heat treated at a temperature of 220°–250° C. and then immersed in an RFL liquid to adhere the RFL to the fibrous material; and the above treated fibrous material is again heat treated at a temperature of 200°–250° C. In the two stage treatment, since the cocondensate has been fully diffused into the polyester fibrous material during the first stage heat treatment by the cocondensate, a satisfactorily high adhesive strength of the cocondensate can be obtained by the second stage heat treatment, at a temperature of 200°–250° C., of the fibrous material having the RFL adhered thereto.

The reason why the alkylphenol/alkylresorcin/formaldehyde cocondensate according to the present invention is effective for bonding polyester fibrous material with rubber is probably as follows. Both the alkylphenol and the alkylresorcin are trifunctional, and therefore the resulting cocondensate is very reactive and has a high reactivity with RF in the RFL. Moreover, since the cocondensate has a high affinity to polyester fiber, the cocondensate has high solubility and diffusing property into polyester fibrous material and diffuses in a large amount on the polyester surface to develop a high adhesive strength.

The reason why the alkylphenol/alkylresorcin/formaldehyde cocondensate according to the present invention is superior to alkylphenol/resorcin/formaldehyde cocondensate in the adhesive strength after heat aging (adhesive strength after lapse of time) has not yet been clearly found out, but is probably due to the action of alkyl group. When all molecules constituting a cocondensate have alkyl groups, the cocondensate is excellent in the adhesive strength after lapse of time.

In order to increase the adhesive strength of the cocondensate of the present invention, the cocondensate can be used together with carriers, which are used at the dyeing of polyester and have an effect for weakening the bonding force between the molecular chains of polyester and an effect for diffusing molecules of foreign substances, such as the cocondensate and the like, between the molecular chains of polyester, or with swelling agents having a high diffusing property into polyester and an effect for swelling between the molecular chains of polyester. As the carriers, use is made of benzoic acid and its derivatives, salicyclic acid and its derivatives, phenol and its derivatives, chloro- or bromo-benzene and the like. As the swelling agent, use is made of 3,5-xylenol/formaldehyde condensate, t-butylphenol/cresol/formaldehyde condensate, m-methoxybenzoic acid/formaldehyde condensate, t-butylphenol/formaldehyde condensate, resorcin disulfide and the like. When the carrier or swelling agent is water soluble, they are directly dissolved in water and used; while when they are insoluble in water, they are dispersed in water in the presence of a proper anionic surfactant and used.

The following examples are given for the purpose of illustration of this invention and are not intended as limitations thereof. In the examples, "parts" and "%" mean by weight.

EXAMPLE 1

Production of m-cresol/alkylresorcin/formaldehyde cocondensate

Into a reactor equipped with a thermometer, an agitator, a reflux cooler and a dropping funnel were charged 108 parts of m-cresol, 108 parts of water and 1.1 parts of potassium hydroxide, and 142 parts of 37% aqueous formaldehyde solution was added dropwise to the mixture in 2 hours while agitating the resulting mixture at 60° C. After completion of the addition of the formaldehyde solution, an agitation was further continued for 3 hours at 60° C., and then the mass was cooled to obtain a homogeneous transparent resol type precondensate of m-cresol. Into another reactor having the same equipments as described above were charged 248 parts of 5-methylresorcin, 290 parts of water and 2.5 parts of oxalic acid. Then, the above obtained m-cresol-formaldehyde reaction liquid was added dropwise to the 5-methylresorcin solution in 2 hours while agitating the resulting mixture at 60° C. After completion of the addition, the resulting mixture was further agitated at 60° C. for 3 hours, and then water in the reaction liquid was removed. The residue was poured into a distillation vessel, and unreacted m-cresol and 5-methylresorcin were removed by a distillation under reduced pressure to obtain a m-cresol/5-methylresorcin/formaldehyde cocondensate.

The m-cresol/5-methylresorcin/formaldehyde cocondensate obtained in the above described method was sampled in an amount of 15 parts in solid basis, and 10.5 parts of 28% aqueous ammonia solution and 73.5 parts of water were added to the sampled cocondensate to obtain an aqueous ammonia solution of the m-cresol/5-methylresorcin/formaldehyde cocondensate. Then, 75 parts of this aqueous ammonia solution of the cocondensate was mixed with 100 parts of an RFL having a composition shown in the following Table 1 to produce an adhesive liquid. This RFL had previously been produced by aging for 48 hours a mixture having the following composition.

TABLE 1

|  | Parts |
|---|---|
| Water | 518.8 |
| Resorcin | 11.0 |
| Formaldehyde (37%) | 16.2 |
| Ammonium hydroxide (28%) | 10.0 |
| Vinylpyridine/styrene/butadiene copolymer rubber latex (41%) | 244.0 |

As a polyester fibrous material, there was used a polyethylene terephthalate tire cord having a twist structure of 1,500 d/2, a ply twist number of 40 turns/10 cm and a cable twist number of 40 turns/10 cm. The tire cord was immersed in the above described adhesive liquid, dried at 150° C. for 1.5 minutes and then heat treated for 2 minutes under an air atmosphere kept at 240° C. The initial adhesive strength of the adhesive liquid, the adhesive strength thereof after lapse of time and the decreasing of strength of cord were evaluated by using the above described adhesive-treated cord and a rubber composition having a compounding recipe shown in the following Table 2.

TABLE 2

|  | Parts |
|---|---|
| Natural rubber | 80 |
| Styrene/butadiene copolymer rubber | 20 |
| Carbon black | 40 |
| Stearic acid | 2 |
| Petroleum series softener | 10 |
| Pine tar | 4 |
| Zinc oxide | 5 |
| N—Phenyl-β-naphthylamine | 1.5 |
| 2-Benzothiazyl disulfide | 0.75 |

TABLE 2-continued

|  | Parts |
|---|---|
| Diphenylguanidine | 0.75 |
| Sulfur | 2.5 |

The initial adhesive strength of the adhesive liquid was evaluated in the following manner. The cord treated with the above described adhesive liquid was embedded in the unvulcanized rubber composition having a compounding recipe shown in the above described Table 2, and the mass was vulcanized at 145° C. for 30 minutes under a pressure of 20 kg/cm². Then, the cord was digged out from the vulcanizate and peeled from the vulcanizate at a rate of 30 cm/min to measure the peeling resistance, which was the initial adhesive strength (kg/cord) of the adhesive liquid. The obtained results are shown in Table 3.

The adhesive strength after heat aging (adhesive strength after lapse of time) was evaluated in the following manner. The obtained results are also shown in Table 3.

Adhesive strength after lapse of time

A vulcanizate produced in the same manner as described in the production of the vulcanizate for evaluating the initial adhesive strength was sealed into a glass tube, the interior of which had previously been replaced by nitrogen, and left to stand for 5 days in an oven kept at 125° C. Then, the peeling resistance of the polyester cord from the rubber was measured in the same manner as described in the evaluation of the initial adhesive strength. This peeling resistance represents the adhesive strength after lapse of time.

EXAMPLES 2-6 AND COMPARATIVE EXAMPLES 1-3

The same tests as described in Example 1 were carried out, except that m-cresol/5-methylresorcin/formaldehyde cocondensate used in Example 1 was replaced by various cocondensates. The obtained results are shown in Table 3. When water-insoluble cocondensate was used, the cocondensate was agitated in water together with Demol EP (trademark of an anionic surfactant sold by Kao Atlas Co.) and glass beads to form an aqueous dispersion of the cocondensate.

EXAMPLES 7-11 AND COMPARATIVE EXAMPLE 4

The same m-cresol/5-methylresorcin/formaldehyde cocondensate and RFL as used in Example 1 were mixed in various mixing ratios, and adhesive strength test were carried out in the same manner as described in Example 1. The obtained results are shown in Table 4.

EXAMPLE 12

An adhesive strength test was carried out in the same manner as described in Example 1, except that a two stage treatment is carried out in place of the one stage treatment described in Example 1. The obtained results are also shown in Table 3.

TABLE 3

|  | Cocondensate (F represents formaldehyde) | Initial adhesive strength in one stage treatment (kg/cord) | Adhesive strength after lapse of time (kg/cord) |
|---|---|---|---|
| Example 1 | m-Cresol/5-methylresorcin/F | 3.36 | 2.50 |
| Example 2 | m-Cresol/5-ethylresorcin/F | 3.34 | 2.42 |
| Example 3 | m-Cresol/5-propylresorcin/F | 3.30 | 2.38 |
| Example 4 | m-Propylphenol/5-methylresorcin/F | 3.30 | 2.35 |
| Example 5 | 3,5-Dipropylphenol/5-methylresorcin/F | 3.28 | 2.32 |
| Example 6 | 3,5-Xylenol/5-methylresorcin/F | 3.34 | 2.40 |
| Comparative example 1 | m-Cresol/resorcin/F | 3.27 | 1.98 |
| Comparative example 2 | p-Cresol/5-methylresorcin/F | 2.96 | 1.88 |
| Comparative example 3 | p-Cresol/resorcin/F | 2.90 | 1.70 |
| Example 12 | m-Cresol/5-methylresorcin/F | 3.60 (two stage treatment) |  |

TABLE 4

|  | m-Cresol/5-methyl-resorcin/formaldehyde cocondensate RFL | Adhesive strength in on stage treatment (kg/cord) |
|---|---|---|
| Comparative example 4 | 0/100 | 0.42 |
| Example 7 | 25/100 | 3.20 |
| Example 8 | 50/100 | 3.30 |
| Example 9 | 100/100 | 3.26 |
| Example 10 | 125/100 | 3.20 |
| Example 11 | 150/100 | 2.98 |

What is claimed is:

1. An adhesive for polyester fibrous material, comprising an alkylphenol/alkylresorcin/formaldehyde cocondensate having substantially an average molecular weight of 300–600 and obtained by condensing
   a compound selected from compounds represented by a general formula

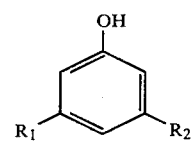

wherein $R_1$ represents a hydrogen atom or an alkyl group having 1-3 carbon atoms, and $R_2$ represents an alkyl group having 1-4 carbon atoms, and
a compound selected from compounds represented by a general formula

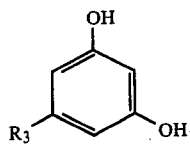

wherein $R_3$ represents an alkyl group having 1–3 carbon atoms, together with formaldehyde in the presence of an acidic catalyst.

2. A method of giving an adhesive property to a polyester fibrous material by an alkylphenol/alkylresorcin/formaldehyde cocondensate, wherein the alkylphenol/alkylresorcin/formaldehyde cocondensate according to claim 1 is adhered to the polyester fibrous material and then the fibrous material is treated with a resorcin/formaldehyde/latex (RFL), or the polyester fibrous material is treated with an adhesive composition comprising a mixture of the cocondensate and the RFL.

* * * * *